(12) United States Patent
Smith

(10) Patent No.: US 7,497,239 B2
(45) Date of Patent: Mar. 3, 2009

(54) SLIDING TABLE FOR MACHINE OR WORKBENCH

(76) Inventor: Darrin Eugene Smith, 124 Big Bay Point Road, Barrie, Ontario (CA) L4N 9B4

( * ) Notice: Subject to any disclaimer, the term of this patent is extended or adjusted under 35 U.S.C. 154(b) by 0 days.

(21) Appl. No.: 11/486,023

(22) Filed: Jul. 14, 2006

(65) Prior Publication Data

US 2007/0034292 A1    Feb. 15, 2007

(51) Int. Cl.
*B25H 1/14* (2006.01)
(52) U.S. Cl. .................................. 144/286.5; 83/477.2
(58) Field of Classification Search ................ 144/285, 144/286.1, 286.5, 287; 108/143, 90, 93, 108/103; 83/435.11–435.27, 437, 477.2, 83/477.27, 438, 469, 472, 474
See application file for complete search history.

(56) References Cited

U.S. PATENT DOCUMENTS

| | | | |
|---|---|---|---|
| 2,383,195 A | 8/1945 | Horman | |
| 2,519,695 A | 8/1950 | Olsson | |
| 2,522,695 A | 9/1950 | Walter | |
| 2,526,518 A | 10/1950 | Turrettini | |
| 3,198,588 A | 8/1965 | Cashman | |
| 3,240,244 A | 3/1966 | Biro | |
| 3,265,450 A | 8/1966 | Aho | |
| 3,557,721 A * | 1/1971 | Worm | 108/43 |
| 3,643,536 A | 2/1972 | Alexander | |
| 4,118,101 A * | 10/1978 | Teramachi | 384/45 |
| 5,201,863 A | 4/1993 | Peot | |
| 6,189,429 B1 * | 2/2001 | Liu | 83/477 |
| 6,508,281 B1 | 1/2003 | Wang | |
| 6,619,348 B2 | 9/2003 | Wang | |
| 6,748,987 B2 * | 6/2004 | Ayala et al. | 144/286.5 |
| 6,817,275 B1 | 11/2004 | Chin-Chin et al. | |
| 7,059,370 B2 * | 6/2006 | Wang | 144/287 |
| 7,337,701 B2 * | 3/2008 | Smith | 83/438 |

* cited by examiner

*Primary Examiner*—Shelley Self

(57) ABSTRACT

The sliding table has a stationary bed and a carriage which is movable relative to the bed. The carriage has an upper surface on which a work piece is seated. The bed has rollers and the bed has a track. Alternatively, the bed has a track and the carriage has rollers. In either case, the rollers roll back and forth in the track. Either the rollers are biased into contact with the track or the track is biased into contact with the rollers. In the former case, an eccentric and a coil spring are used to bias the rollers. In the latter case, the track has a bearing plate which is biased by a rubber strip or O-ring cord stock into contact with the rollers.

18 Claims, 10 Drawing Sheets

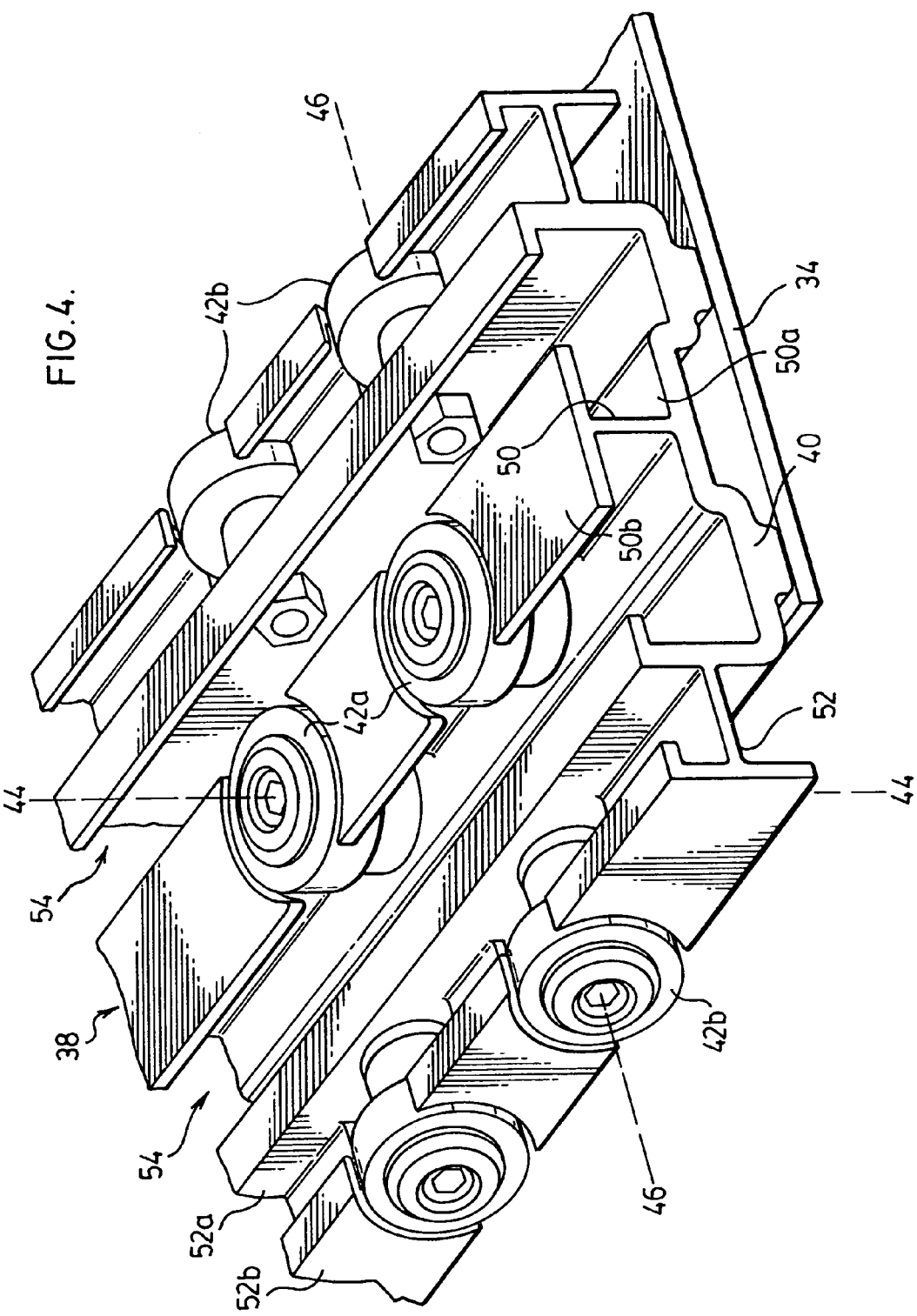

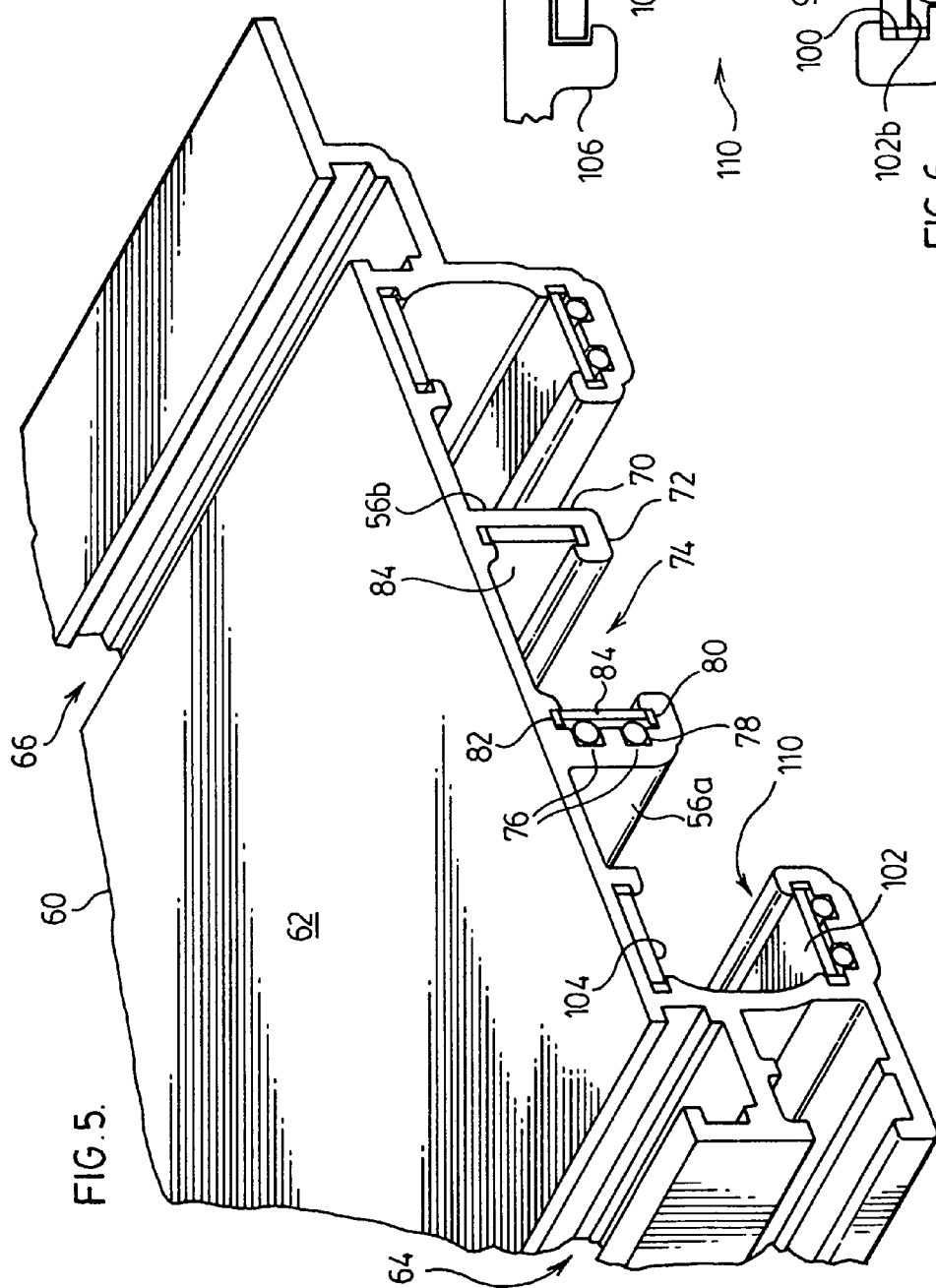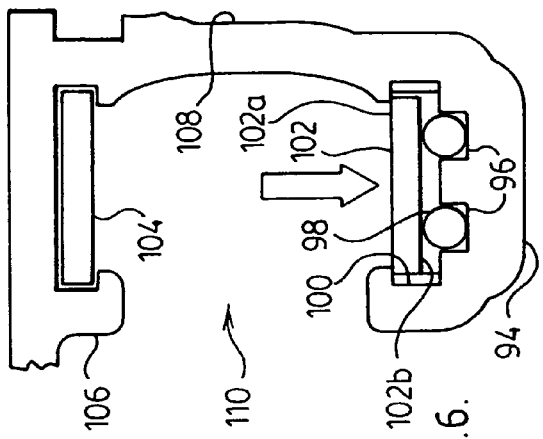

SLIDING TABLE FOR MACHINE OR WORKBENCH

FIELD OF THE INVENTION

This invention relates to sliding tables for use in conjunction with any machine or workbench that is used for doing mechanical or practical work. More particularly the invention relates to a sliding table for use in conjunction with a workbench or a machine such as a table saw, router table, shaper, drill press, band saw or workbench. The sliding table has means for accurately guiding the movement of the table and minimizing rocking of the table on its longitudinal and transverse axes.

BACKGROUND OF THE INVENTION

Sliding tables for workbenches are known for providing lateral support to a piece of work or stock in front of or behind the workbench. Such tables usually travel on a path which is perpendicular to the longitudinal axis of the workbench. The path extends from in front of the workbench to behind it and, in general, the longer the path, the more useful and versatile the table is. However the table become increasing unstable as the path lengthens. That is because the longer the path, the larger the portion of the table that is cantilevered when the table is at the ends of its travel. The cantilevered portion is not supported and for that reason is relatively unstable. Any weight on the table may cause the machine or workbench to tip over or may cause the table to bend or fracture.

I have found a way of significantly extending the length of travel of a sliding table while at the same time providing improved control and guidance of a piece of work on the sliding table. The way in which I do so involves the use of, among other things, a movable carriage on which the piece of work is located. I also use spring-loaded rotating means such as rollers. Alternatively, bearing plates apply pressure to rollers for accurately guiding the table while it is sliding so that precise work can be carried out on the table.

SUMMARY OF THE INVENTION

Briefly, the sliding table of my invention is used for guiding a work piece including: a bed adapted to be immobilized and a carriage movable relative to the bed and having a surface upon which the work piece is adapted to be located. Either the bed or the carriage has rotating means and the other has a track in which the rotating means revolves. Resilient means is provided for causing the rotating means and the track to be biased toward each other.

DESCRIPTION OF THE DRAWINGS

The sliding table of the invention is described with reference to the accompanying drawings in which:

FIG. 4 is an enlarged fragmentary perspective view of the bed;

FIG. 5 is a fragmentary perspective view of the carriage which slides on the bed;

FIG. 6 is a section of a portion of the carriage;

Like reference characters refer to like parts throughout the description of the drawings.

DESCRIPTION OF PREFERRED EMBODIMENTS

Figure 1:
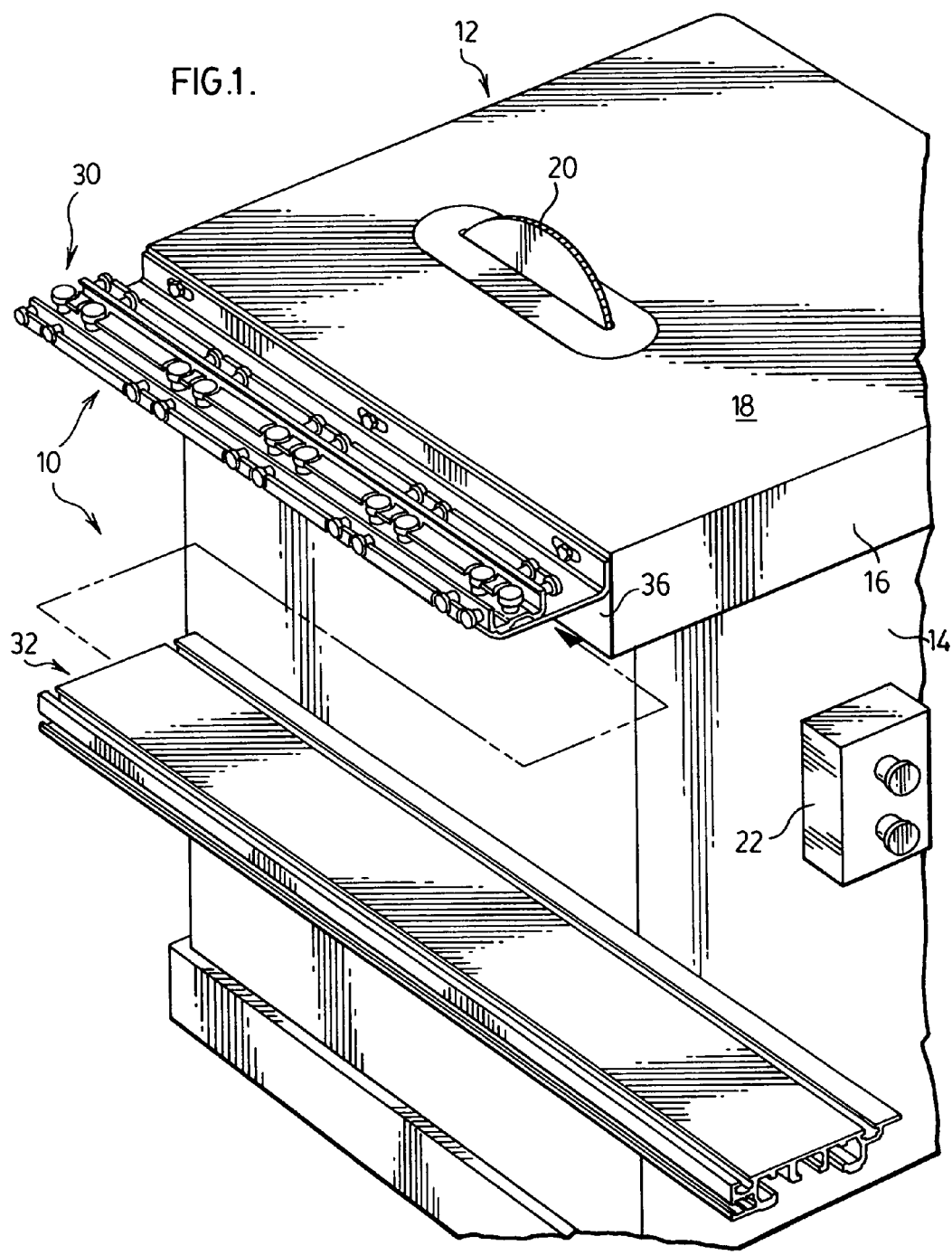
FIG. 1 is a perspective view of the sliding table in conjunction with a table saw.
Figure 2:
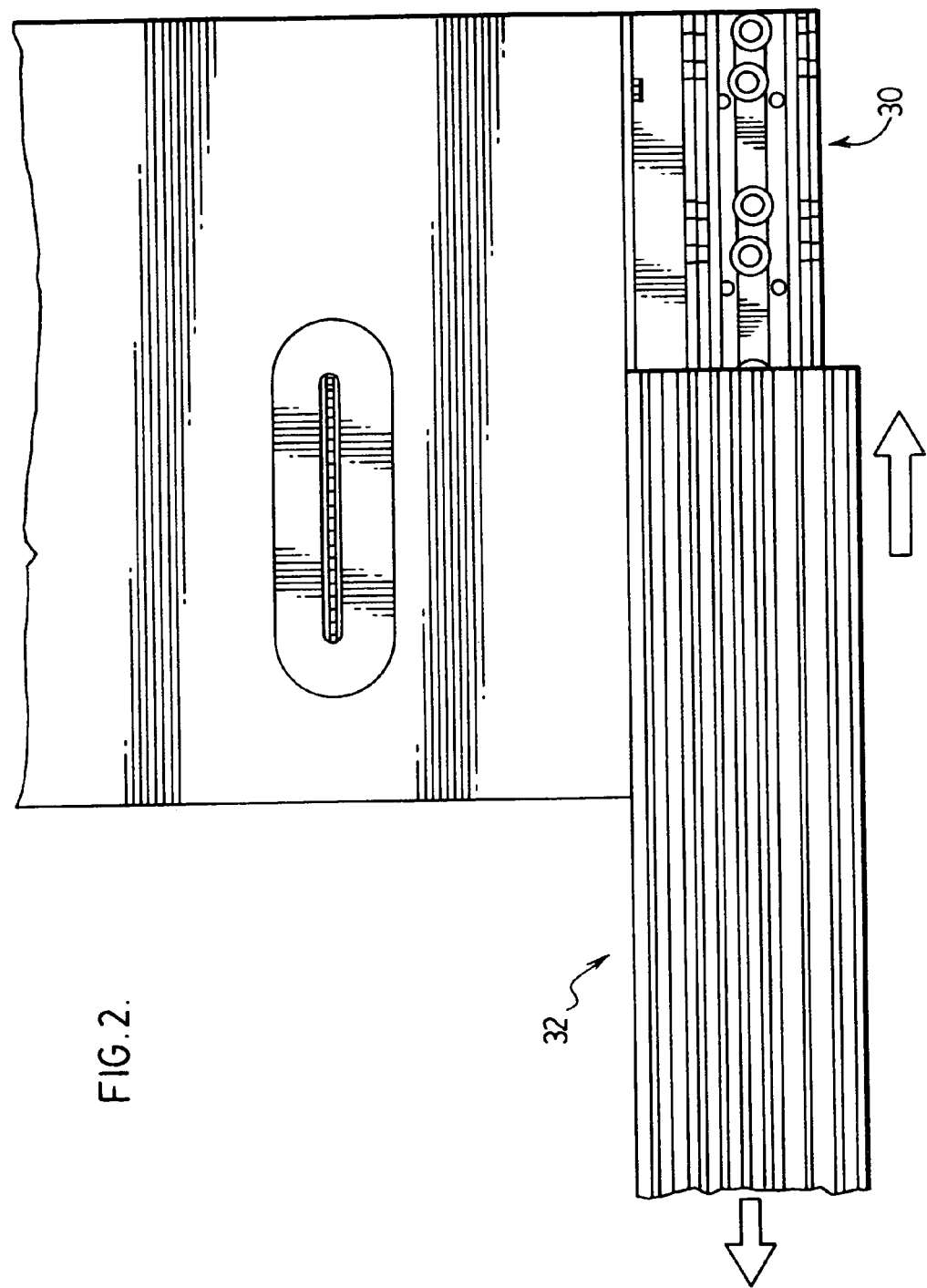
FIG. 2 is a plan view of the sliding table and table saw.

With reference to FIGS. 1 and 2, the sliding table of the invention, generally 10, is shown in conjunction with a table saw, generally 12. The table saw is conventional and consists of a housing 14 and an upper panel 16 having a working surface 18 through which a circular saw blade 20 projects. An electrical box 22 having on-off switches control the operation of the saw.

The sliding table includes a bed, generally 30 and an upper carriage, generally 32 which is mounted for sliding on the bed.

Figure 3:
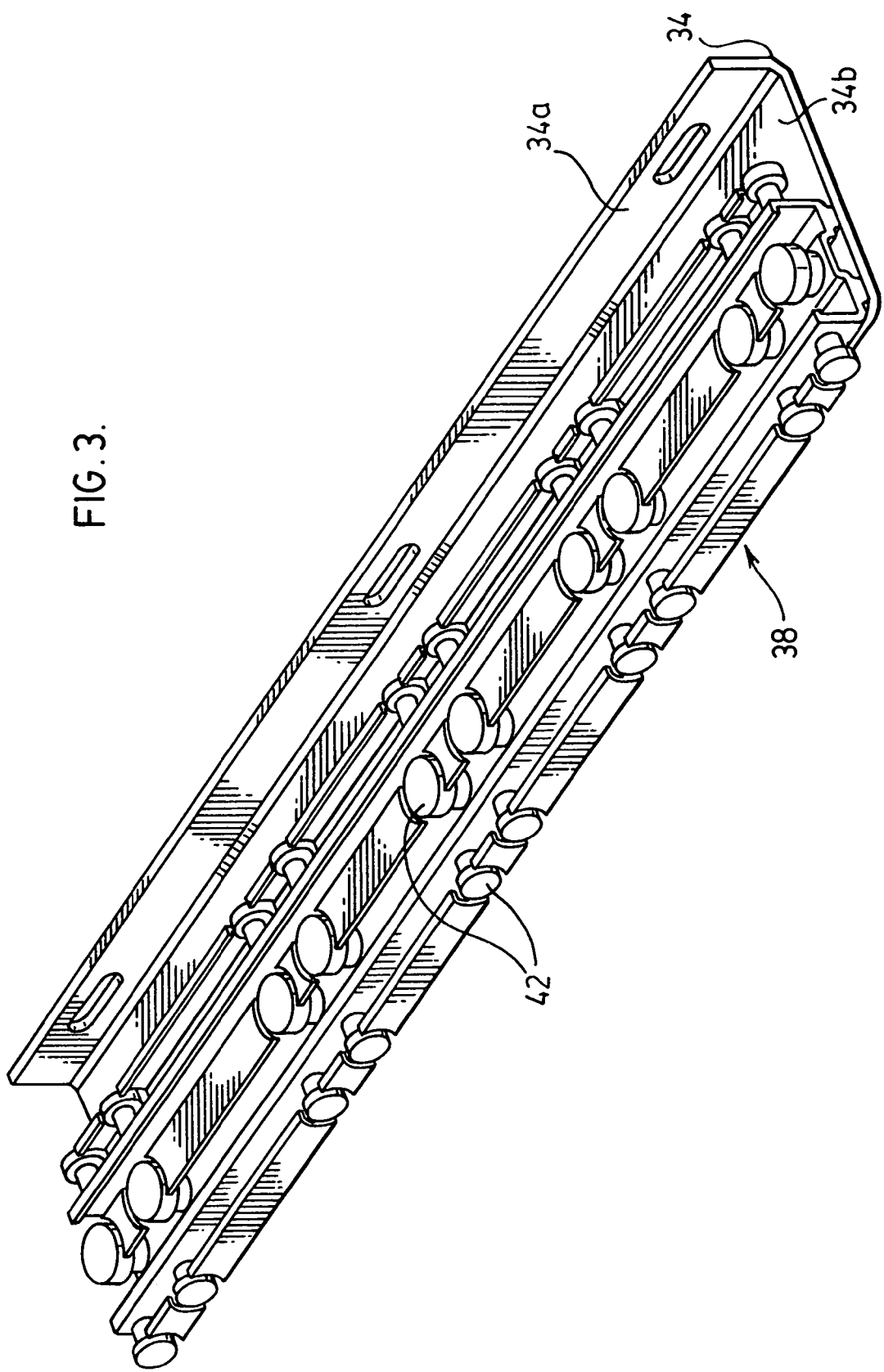
FIG. 3 is a perspective view of a bed of the sliding table.

With reference to FIGS. 1 and 3, the bed is provided with a bracket 34 having a vertical leg 34a which is bolted to the side edge 36 of the table saw and a lower horizontal leg 34b on which a roller assembly, generally 38, is mounted.

With reference to FIGS. 3 and 4, the roller assembly includes a framework 40 to which a number of rollers 42 are mounted for rotation. The rollers are arranged in groups of six spaced along the length of the framework. A pair of rollers 42a in each group is disposed centrally between the other rollers in the group and rotates about a vertical axis 44-44. The remaining rollers 42b in the group are arranged outwardly of the central rollers. The outer rollers are arranged in pairs on opposite sides of the central rollers and rotate about a horizontal axis 46-46.

The framework has a central longitudinally extending I-shaped segment 50. The central rollers 42a are mounted for rotation on lower horizontal wall 50a of the I-segment and extend through openings in its upper horizontal wall 50b. On opposite sides of the central I-segment and spaced apart therefrom are distal I-shaped segments 52. The outer rollers 42b are mounted for rotation to the inner vertical walls 52a of the distal segments and extend through openings in its outer vertical wall 52b.

The spaces between the central and distal I-segments, marked by arrows 54, constitute two parallel longitudinally extending slots or tracks for receipt of downwardly extending flanges 56a,b formed on the carriage. The flanges are shown in FIG. 5 and are described in detail below.

With reference to FIGS. 5 and 6, the carriage is provided with an upper wall 60 with an upper surface 62 which is flush with the working surface 18 of the table saw. Grooves, generally 64, 66, are formed in the upper wall. The grooves which are horizontally spaced and longitudinally extending are provided to accommodate a fence. An example of such a fence is described in my co-pending applications for patents filed in the United States Patent & Trademark Office under Ser. No.

10/678,228 and in the Canadian Intellectual Property Office under serial no. 2,444,371. Both applications were filed on Oct. 6, 2003.

The flanges 56a,b are spaced apart from one another and each is made up of a downwardly extending vertical limb 70 and a short horizontal limb 72 at the lower end of the vertical limb. The side walls of vertical limbs which face one another define opposite sides of a track, generally 74. On the inside wall of flange 56a is a pair of vertically spaced longitudinally extending grooves 76. Each groove receives an elongated strip 78 of rubber, O-ring cord stock or like deformable flexible material.

A longitudinally extending groove 80 is also formed in the horizontal limb 72 of flange 56a and a second longitudinally extending groove 82 is formed in the lower surface of wall 60. Groove 82 is vertically above groove 80 and both grooves receive a vertically extending bearing plate 84. The bearing plate extends the length of the carriage and is biased outward by the resiliently deformable strips 78.

Flange 56b also has a bearing plate 84 mounted in grooves in the flange. The two bearing plates in flanges 56a,b face one another and the space between them defines the side wall boundaries of track 74 in the carriage.

Flanges 56a,b are arranged centrally of the carriage. Disposed outwardly of the central flanges are distal flanges 90a, b. With reference to FIGS. 5 and 6, the distal flanges are also L-shaped but their lower horizontal limbs 94 are longer than those of flanges 56 for accommodation of a pair of parallel grooves 96. The latter grooves receive elongated strips 98 of resiliently deformable material.

Horizontally opening grooves 100 in each distal flange receive a bearing plate 102 which is biased outwardly by resiliently deformable strips 98. Vertically above the bearing plate 102 is another bearing plate 104 mounted in a groove in a short flange 106 and in the vertical limb 108 of the distal flange. The two bearing plates 102, 104 face one another and the space between them forms a outer track 110 in the carriage. The upper side face 102a of the bearing plate is in contact with the roller within track 110. The oppositely facing lower side face 102b of the bearing plate faces grooves 96 in which the strips of resiliently deformable are located.

Figure 8:
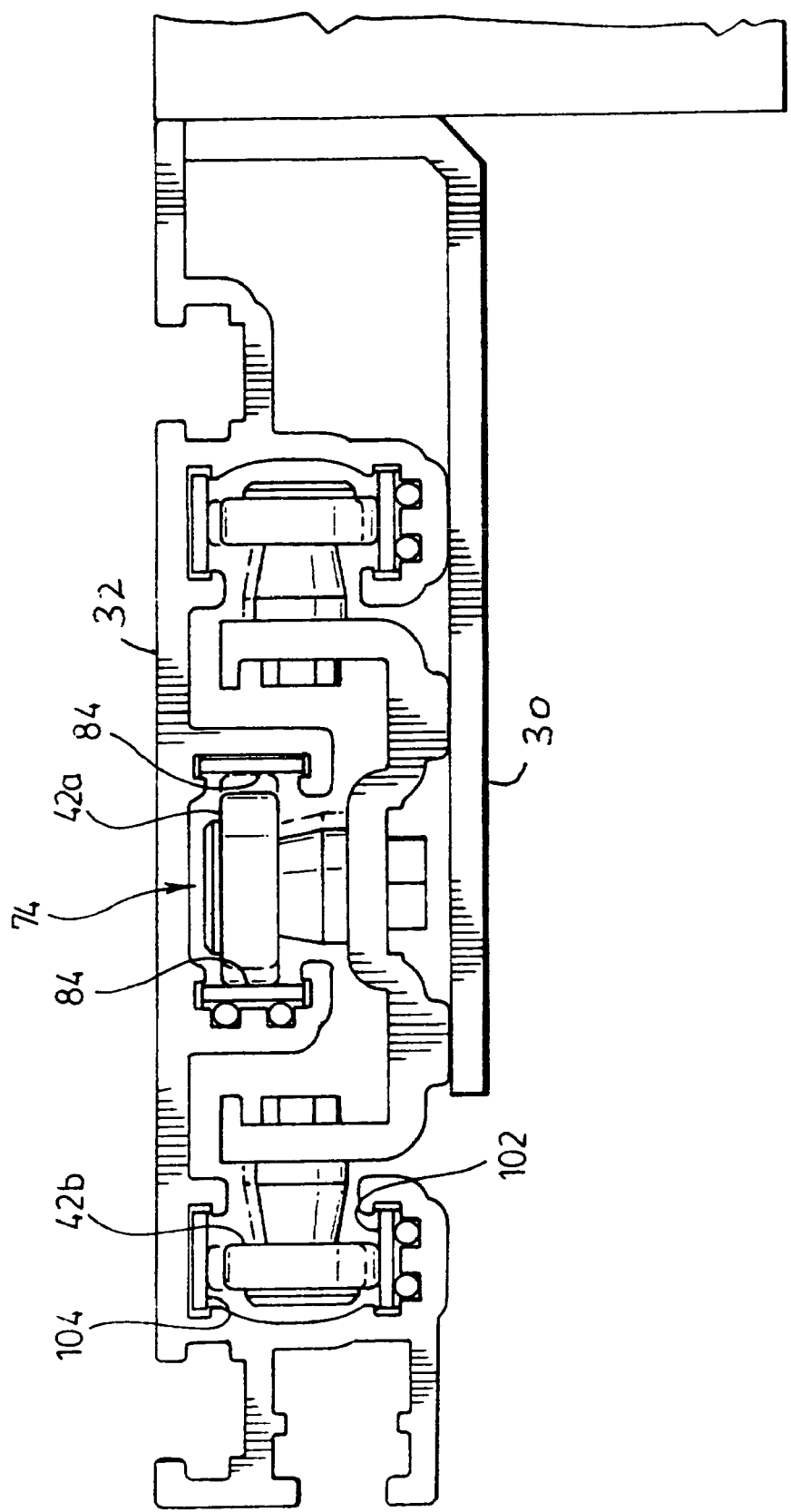
FIG. 8 is an elevation of the components illustrated in FIG. 7 from the front.

With reference to FIG. 8, the central rollers 42a are received in central track 74 in the carriage such that the outer walls of the rollers contact the bearing plates 84 on opposite sides of the rollers. Similarly outer rollers 42b are received in tracks 110 such that their outer walls contact bearing plates 102, 104.

Figure 8A:
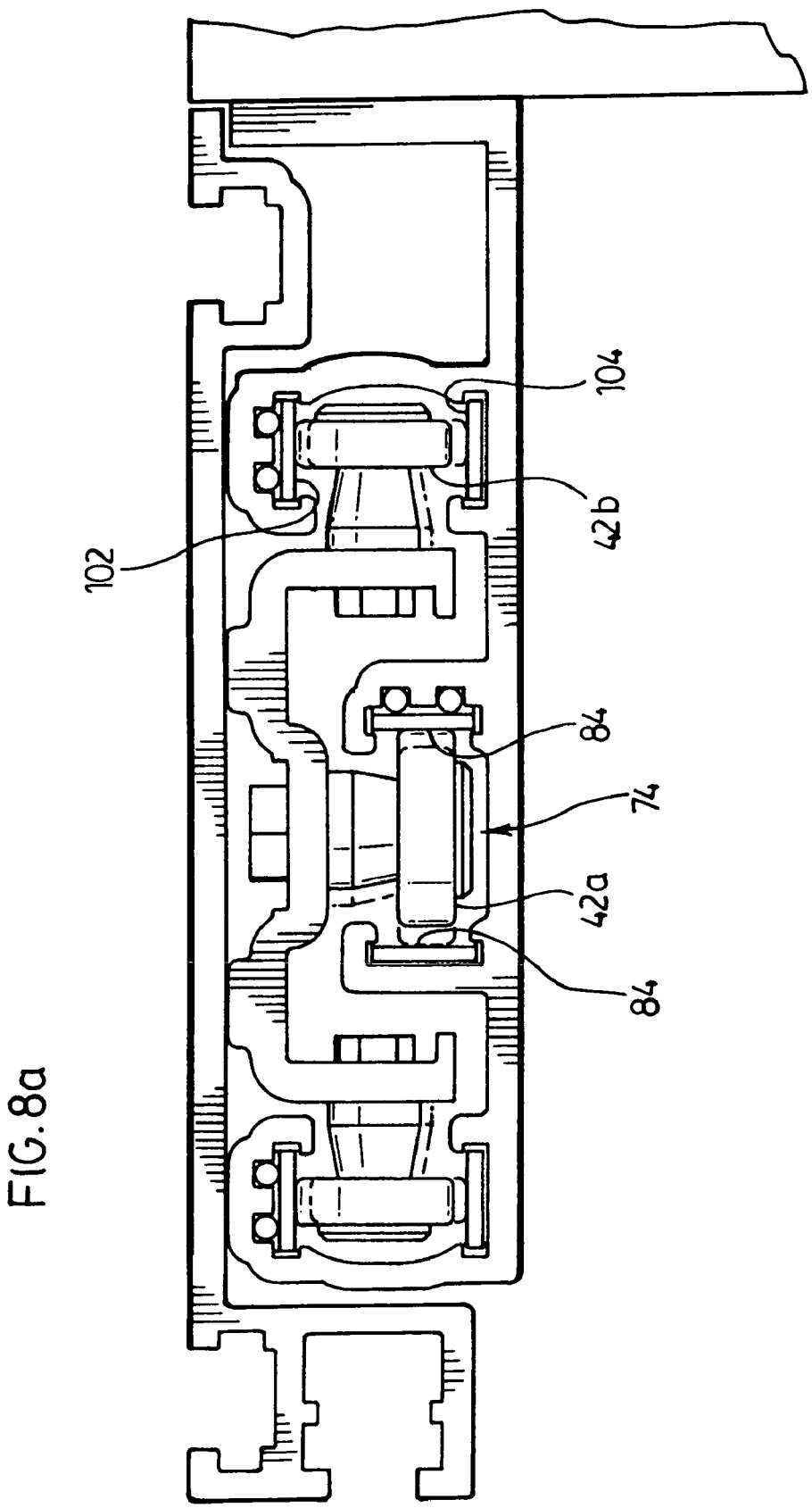
FIG. 8a is an elevation of the bed and carriage in which the carriage is provided with rollers and the bed is provided with a track.

FIG. 8a is the same as FIG. 8 except that rollers 42a,b are provided on the carriage while the track 74 is provided in the bed. The bed is attached to the side edge 36 of the workbench while the carriage is floating.

Figure 9:
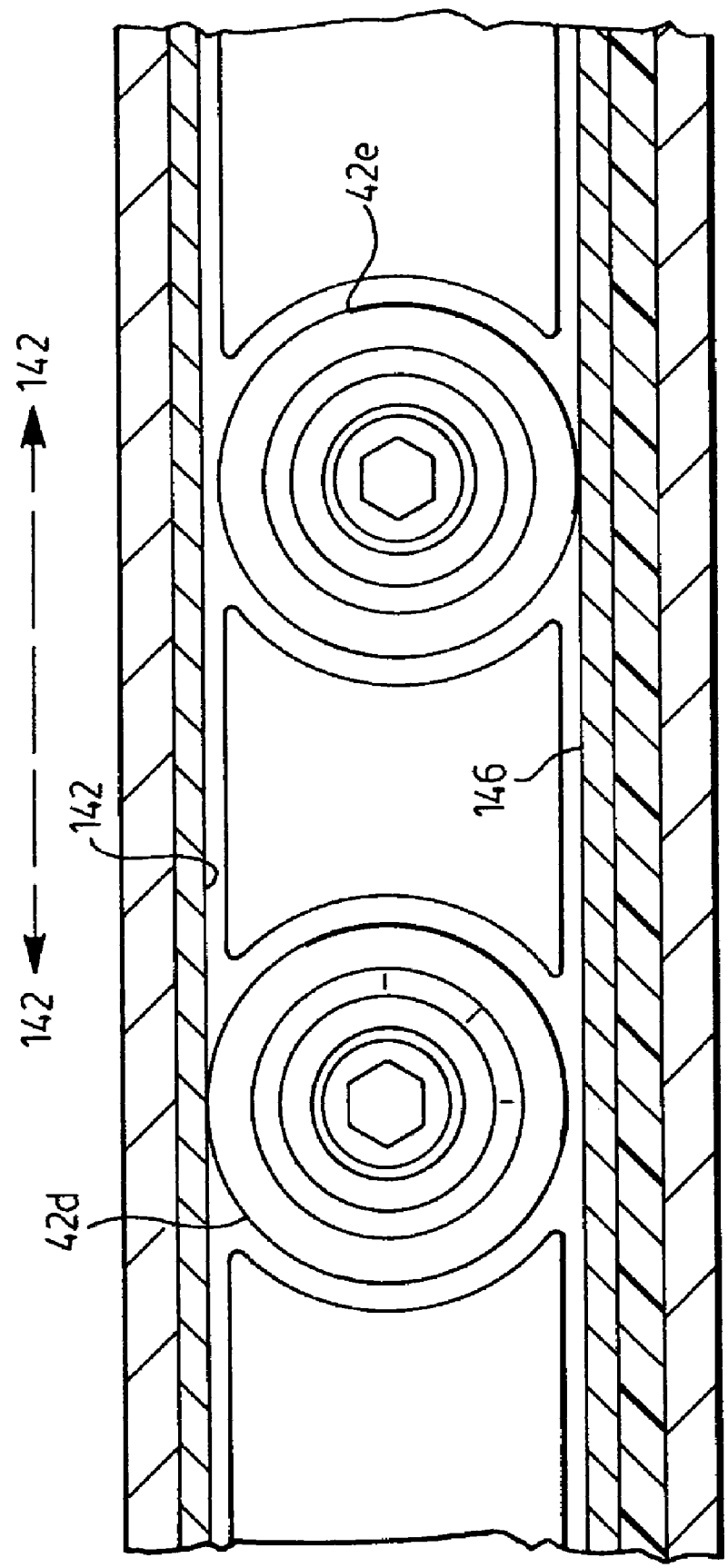
FIG. 9 is an elevation a portion of the bed from the side showing two rollers on which the carriage slides.

In operation and with reference to FIG. 9, the bearing plates, biased by the strips of resiliently deformable material, minimize rocking of the carriage on its longitudinal axis 142. In that Figure the carriage has rocked clockwise and the upper wall of roller 42d bears against the upper bearing plate 142 while the lower wall of roller 42e bears against the lower bearing plate 146 and causes it to deform slightly. The resiliently deformable strips behind the two bearing plates will resist such deformation and will urge the plates to return to their undeformed state. As the plates return. they will dampen the rocking movement of the carriage.

Figure 7:
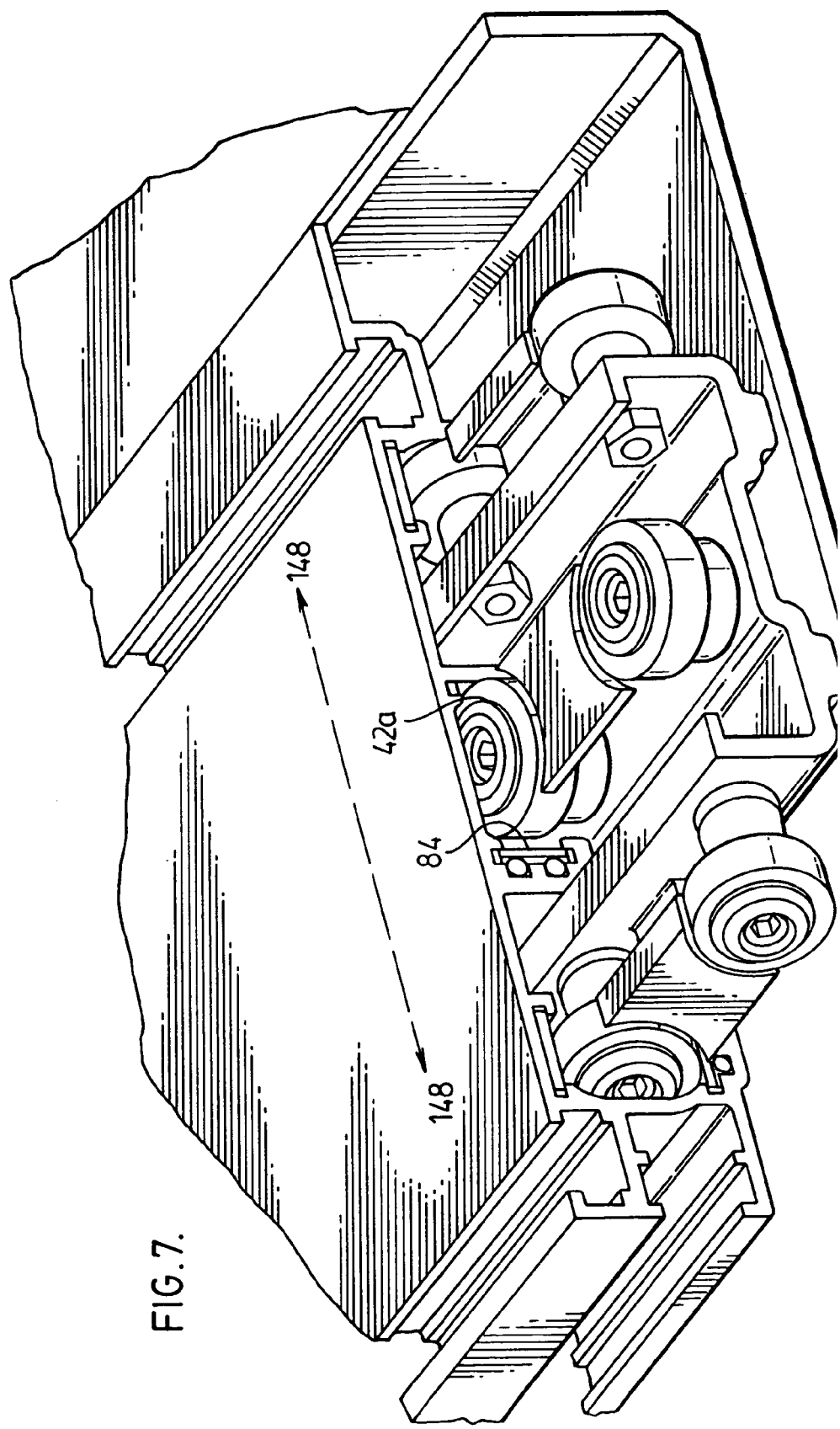
FIG. 7 is a enlarged fragmentary perspective view of the carriage and bed.

In like manner and with reference to FIG. 7, central rollers 42a minimize rocking of the carriage on its transverse axis 148-148 since such rocking will force some of the central rollers into contact with the bearing plate behind which the resiliently deformable strips are located. The strips will resist deformation of the bearing plates and will urge the plates to return to their undeformed state. Lateral movement will be dampened by such movement.

In the embodiment of the sliding table just described, bearing plates biased by the strips of resiliently deformable material dampen the rocking of the carriage. In the second embodiment of the invention described below, the rollers are spring loaded and it is they that dampen the rocking of the carriage.

Figure 10:
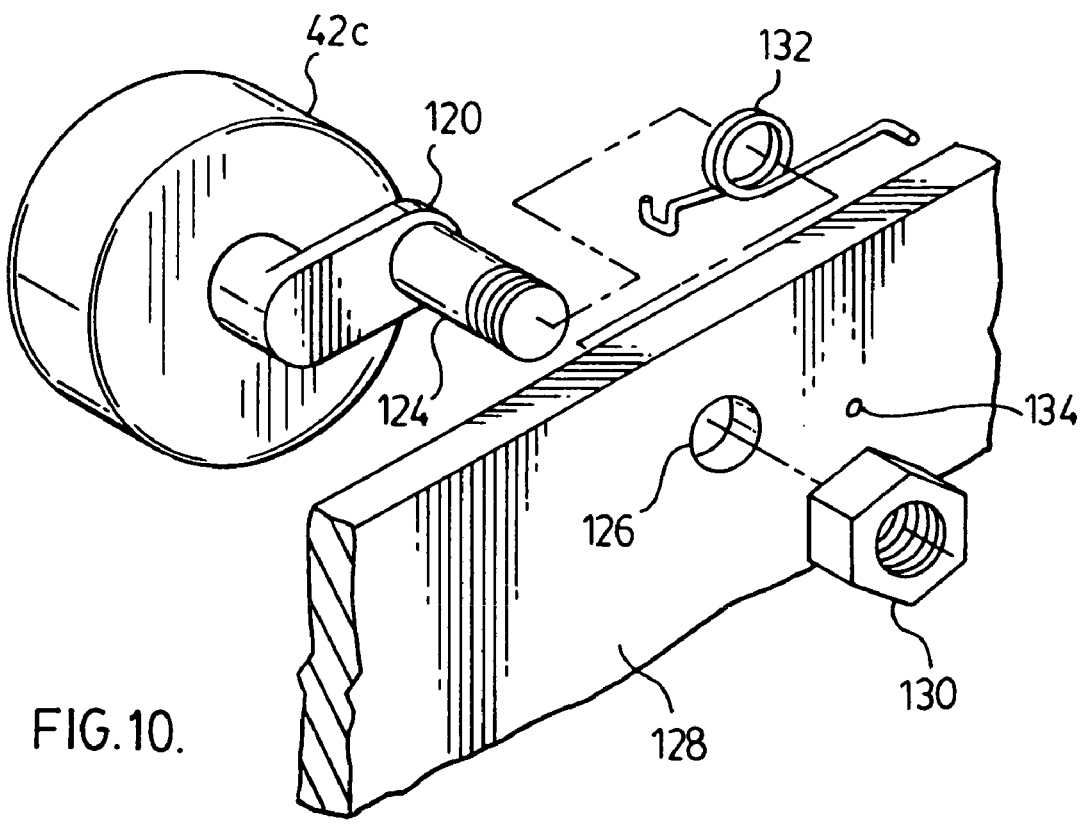
FIG. 10 is an exploded perspective view of the components of one of the rollers of a second embodiment of the sliding table.
Figure 11:
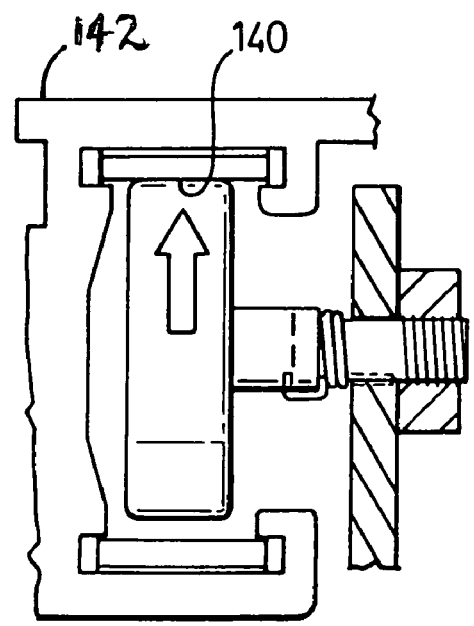
FIG. 11 is a sectional view of the roller illustrated in FIG. 10 in conjunction with a sectional view of a portion of the carriage adjacent to the roller.

With reference to FIGS. 10 and 11, roller 42c is connected to eccentric 120 and the eccentric in turn is connected to a threaded shank 124. The shank passes through an opening 126 in wall 128 of the framework and is held to the plate by means of nut 130. The nut prevents the shank from withdrawing from wall 128 but does not prevent the shank from pivoting relative to the wall. A coil spring 132 encircles the shank and one of its ends is received in an opening 134 in the wall while the other end engages the outer wall of the shank. The spring urges the shank to pivot clockwise and as the shank pivots, the roller is urged in the direction of the arrow in FIG. 11 into contact with bearing plate 140.

It will be understood that the rollers of FIGS. 10 and 11 may be substituted for the rollers of the preceding FIGS. 1 to 9 in which case pressure plates and rubber strips may be dispensed with. The carriage will resist rocking in both the longitudinal and lateral directions.

The rollers are biased into pressure plate 140 of the track 142. Alternatively, the pressure plate may be provided on the carriage in which case the rollers are provided on the track.

It will be understood, of course, that modifications can be made in the embodiments of the invention illustrated and described without departing from the scope and purview of the invention as set in the appended claims.

I claim:

1. A sliding table for guiding a work piece comprising: a bed adapted to be immobilized; a carriage movable relative to said bed and having a surface for guiding said work piece; one of said bed and said carriage having a roller and the other of said bed and said carriage having a track defined by a pair of spaced apart side walls both of which side walls contact said roller and between which side walls said roller rolls back and forth; at least one of said side walls having resilient means for biasing said roller into contact with the other said side wall such that rocking of said roller in said track is dampened, wherein said roller is arranged in two groups, the roller in one said group revolving about a horizontal axis and the roller in the other said group revolving about a vertical axis.

2. A sliding table for guiding a work piece comprising: a bed adapted to be immobilized; a carriage movable relative to said bed and having a surface for guiding said work piece, one of said bed and said carriage having a roller and the other of said bed and said carriage having a track defined by a pair of spaced apart side walls both of which side walls contact said roller and between which side walls said roller rolls back and forth; said rotating means having resilient means for biasing said roller into contact with said one side wall such that rocking of said roller in said track is dampened, wherein said roller is arranged in two groups, the roller in one said group revolving about a horizontal axis and the roller in the other said group revolving about a vertical axis.

3. The sliding table of claim 1 wherein said sliding table is for use in conjunction with a working surface of a machine or a workbench and said bed is adapted to be immobilized relative to said working surface.

4. The sliding table of claim 3 wherein said bed is attachable to said machine or workbench and said carriage has a wall flush with said working surface.

5. The sliding table of claim 1 wherein said track has an elongated groove and a bearing plate having oppositely facing side faces, one of said side face being in contact with said means for rotating and the other said side face facing said elongated groove, said resilient means being disposed in said groove.

6. The sliding table of claim 5 wherein said resilient means comprises an O-ring cord stock.

7. The sliding table of claim 2 wherein said sliding table is for use in conjunction with a working surface of a machine or a workbench and said bed is adapted to be immobilized, relative to said working surface.

8. The sliding table of claim 2 wherein said bed is attachable to said machine or workbench and said carriage has a wall flush with said working surface.

9. The sliding table of claim 2 further including an eccentric operatively connected to one of said bed and said carriage and pivotal relative thereto, said roller being rotatable relative to said eccentric and being biased by said resilient means into contact with one said side wall.

10. A sliding table for guiding a work piece comprising: a bed adapted to be immobilized; a carriage movable relative to said bed and having a surface for guiding said work piece, one of said bed and said carriage having a roller and the other of said bed and said carriage having a track defined by a pair of spaced apart side walls between which said roller rolls back and forth; at least one said side wall having resilient means for biasing said roller toward the other said side wall such that rocking of said roller in said track is dampened, said track having an elongated groove and a bearing plate having oppositely facing side faces, one of said side face being in contact with said roller and the other said side face facing said elongated groove, said resilient means being disposed in said groove,
wherein said roller is arranged in two groups, the roller in one said group revolving about a horizontal axis and the roller in the other said group revolving about a vertical axis.

11. The sliding table of claim 10 wherein said resilient means comprises an O-ring cord stock.

12. A sliding table for guiding a work piece comprising: a bed adapted to be immobilized; a carriage movable relative to said bed and having a surface for guiding said work piece; one of said bed and said carriage having means for rotating and the other of said bed and said carriage having a track defined by a pair of spaced apart side walls between which said rotating means rolls back and forth; at least one of said side walls having resilient means for biasing said rotating means toward the other said side wall such that rocking of said rotating means in said track is dampened, wherein said track has an elongated groove and a bearing plate having oppositely facing side faces, one of said side face being in contact with said means for rotating and the other said side face facing said elongated groove, said resilient means comprising an O-ring cord stock being disposed in said groove.

13. A sliding table for guiding a work piece comprising: a bed adapted to be immobilized; a carriage movable relative to said bed and having a surface for guiding said work piece; one of said bed and said carriage having means for rotating and the other of said bed and said carriage having a track defined by a pair of spaced apart side walls between which said rotating means rolls back and forth; at least one of said side walls having resilient means for biasing said rotating means toward the other said side wall such that rocking of said rotating means in said track is dampened, wherein said means for rotating is arranged in two groups, the means for rotating in one said group revolving about a horizontal axis and the means for rotating in the other said group revolving about a vertical axis.

14. A sliding table for guiding a work piece comprising: a bed adapted to be immobilized; a carriage movable relative to said bed and having a surface for guiding said work piece, one of said bed and said carriage having means for rotating and the other of said bed and said carriage having a track defined by a pair of spaced apart side walls between which said rotating means rolls back and forth; said rotating means having resilient means for biasing said rotating means toward said one side wall such that rocking of said rotating means in said track is dampened, wherein said means for rotating is arranged in two groups, the means for rotating in one said group revolving about a horizontal axis and the means for rotating in the other said group revolving about a vertical axis.

15. A sliding table for guiding a work piece comprising: a bed adapted to be immobilized; a carriage movable relative to said bed and having a surface for guiding said work piece, one of said bed and said carriage having means for rotating and the other of said bed and said carriage having a track defined by a pair of spaced apart side walls between which said rotating means rolls back and forth; at least one said side wall having resilient means for biasing said rotating means toward the other said side wall such that rocking of said rotating means in said track is dampened, said track having an elongated groove and a bearing plate having oppositely facing side faces, one of said side face being in contact with said rotating means and the other said side face facing said elongated groove, said resilient means comprising an O-ring cord stock being disposed in said groove.

16. A sliding table for guiding a work piece comprising: a bed adapted to be immobilized; a carriage movable relative to said bed and having a surface for guiding said work piece, one of said bed and said carriage having means for rotating and the other of said bed and said carriage having a track defined by a pair of spaced apart side walls between which said rotating means rolls back and forth; said rotating means having resilient means for biasing said rotating means toward said one side wall such that rocking of said rotating means in said track is dampened, and an eccentric pivotal relative to one of said bed and said carriage, said means for rotating being rotatable relative to said eccentric and being biased by said resilient means into contact with one said side wall.

17. The sliding table of claim 2 further including an eccentric operatively connected to said bed and pivotal relative thereto, said roller being rotatable relative to said eccentric and being biased by said resilient means into contact with one said side wall.

18. The sliding table of claim 16 wherein said eccentric is pivotal relative to said bed.

* * * * *